March 29, 1960     J. MÜLLER     2,930,166
GAUGING DEVICE
Filed Jan. 28, 1958     2 Sheets-Sheet 1
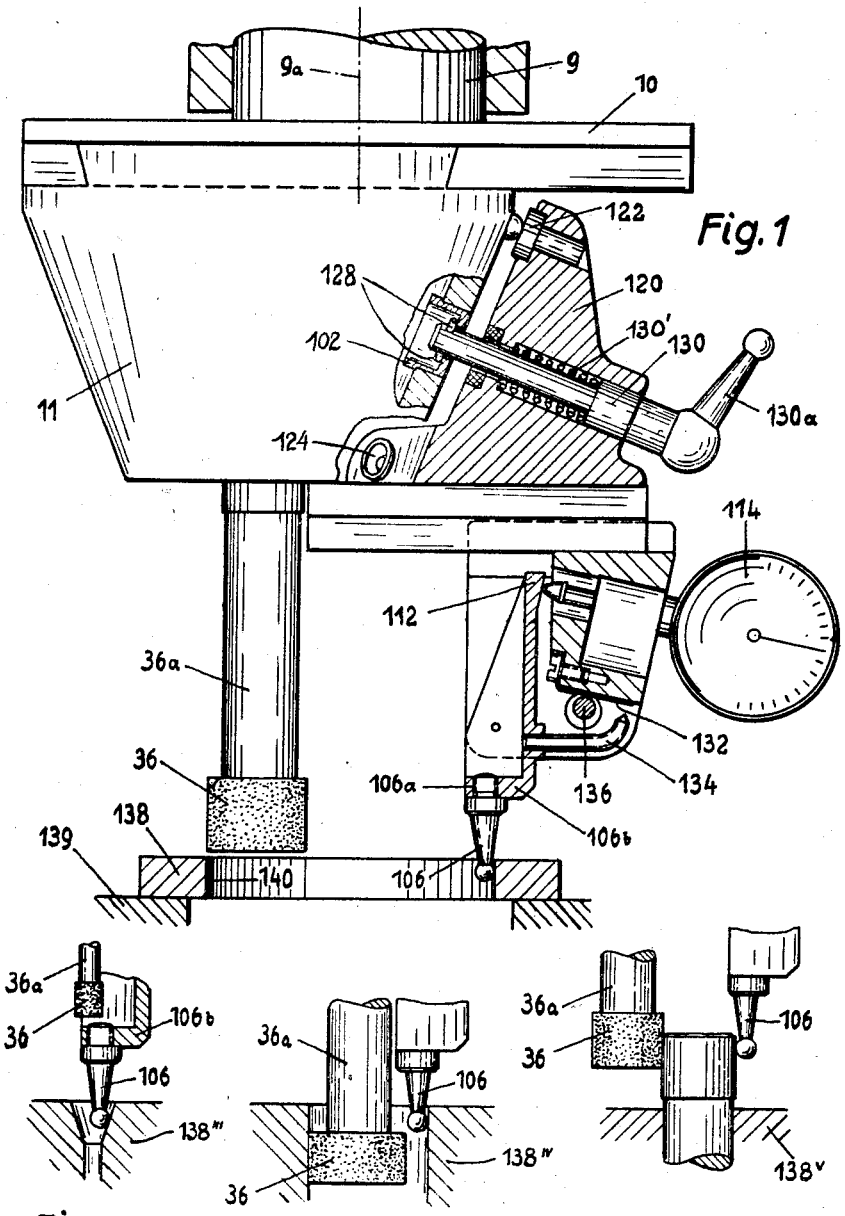
INVENTOR
JOHANN MÜLLER
BY *Dicke & Craig*
ATTORNEYS March 29, 1960 — J. MÜLLER — 2,930,166
GAUGING DEVICE
Filed Jan. 28, 1958 — 2 Sheets-Sheet 2
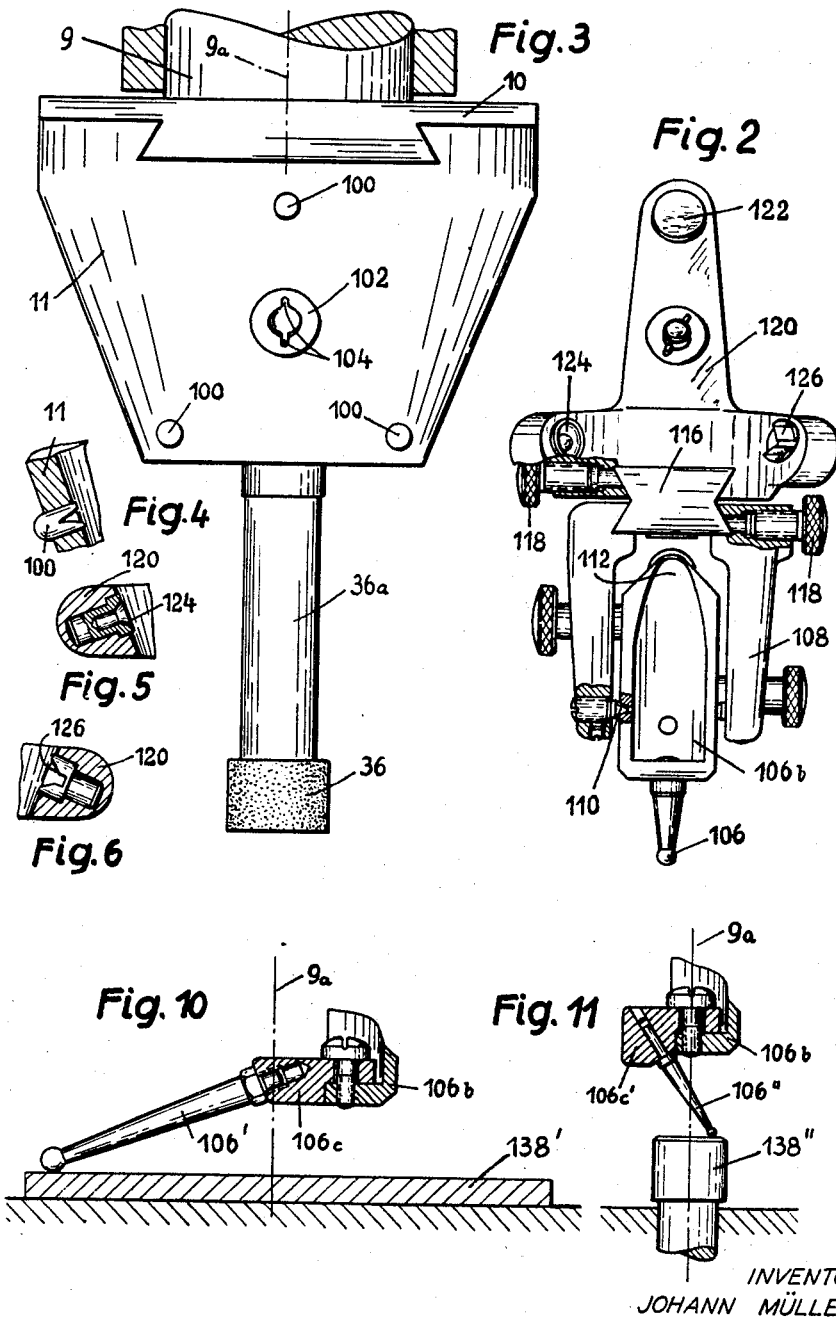
INVENTOR
JOHANN MÜLLER
BY Dicke & Craig
ATTORNEYS united States Patent Office 2,930,166
Patented Mar. 29, 1960

2,930,166
GAUGING DEVICE

Johann Müller, Munich, Germany, assignor to Dr.-Ing. Hans Deckel, Munich, Germany, and Dipl.-Ing. Friedrich Wilhelm Deckel, Zug, Switzerland Application January 28, 1958, Serial No. 711,732

Claims priority, application Germany February 1, 1957

11 Claims. (Cl. 51—165)

The present invention relates to a gauging device which is adapted to be mounted on a rotatable tool holder, possibly a tool holder that can be traversed in relation to the principal axis of revolution, primarily in a machine tool.

The object of the present invention is the provision of a gauging device, by means of which a workpiece can be tested, for instance, for concentricity, without the tool having to be removed from the holder. The necessity of substituting the gauge for the tool in its holder, which arises when using conventional gauging devices, involves loss of time, besides being responsible for the introduction of errors due to the tool not resuming its former position when it is replaced in the holder. It is proposed by the present invention to provide an arrangement in which even the repeated removal of the gauge will not impair the accuracy of a test, and thus to create a gauging device which will fully satisfy the demands for maximum precision in sizing.

The problem is solved in accordance with the present invention by attaching the gauging device to the tool holder outside the socket for the tool by releasable or detachable attaching means, means also being provided for centering the gauging device in a predetermined position in relation to the tool spindle.

According to another feature of the present invention, the means for detachable mounting the gauging device comprises a bayonet-type fitting, whereas the centering means is constituted by a three-point bearing. The gauging device may be, for example, a dial gauge for indicating the position of a contact finger.

Accordingly, it is an object of the present invention to provide a gauging assembly for use with an orbiting tool holder which may be readily detached and attached to the tool holder.

It is another object of the present invention to provide a testing gauge assembly which need not be removed from the tool holder while testing thereby resulting in greater accuracy and considerable savings in time for the testing operation.

Another object of the present invention is to provide a detachable feeler gauge for use with a tool holder which results in a speed-up of the machining operation due to the readily available testing facilities.

Another object of the present invention is the provision of a detachable testing gauge assembly which may be readily attached by means of a bayonet-type lock to the tool holder and which includes appropriate bearing means enabling expansion of the parts due to variations in the temperature.

The invention will be described more particularly hereinafter with reference to the accompanying drawings, in which:

Figure 1 shows the gauging device in its operative position;

Figure 2 shows the centering means of the gauging device;

Figure 3 shows the cooperating centering means of the spindle casing as well as the fitting thereon for attaching the gauging device;

Figures 4 to 6 are details of the centering means; and

Figures 7 to 11 are various working positions of the gauging device.

Figure 1 shows a gauging device according to the present invention in connection with a grinding equipment or installation which comprises, for instance, a grinding head adapted to be mounted on a machine tool in any known manner. The spindle 36a which carries the grinding wheel 36 performs a planetary motion, that is to say, a rotary motion about its own axis as well as a rotary motion about the axis of revolution 9a of the main spindle 9. The casing 11, in which the spindle 36a is supported, can be displaced transversely in relation to the spindle axis 9a along a slide 10.

The casing 11 which may, for instance, contain the means for driving the grinding wheel 36 carries three rounded centering dowels 100 (Figure 4) to form a part of a three-point bearing for purposes of centering, as will appear more fully hereinafter. Approximately in the center of these three centering dowels 100, the casing 11 is provided with a socket member 102 (Figures 1 and 3) having slots 104 for a bayonet-type fastening.

The gauging device consists of a contact finger 106 inserted into a rocker or pivotal member 106b which is pivotally suspended in a forked holder or support bracket 108 between two center points or pins 110 (Figure 2). The end 112 (Figures 1 and 2) of the rocker or pivotal member 106b which is remote from the contact finger thereof, is adapted to control a dial gauge 114 of known construction. The holder or support bracket 108 is movable transversely with respect to the axis 9a of rotation thereof an a double slide 116 and may be clamped in any position by means of two clamping bolts or screws 118 (Figure 2). The bearer or support member 120 (Figures 1 and 2) which carries the double slide 116 and hence the contact finger assembly or feeler gauge has the shape of a three-armed body provided with three arms, each provided with a complementary centering means 122, 124 and 126 for cooperation with the centering dowels 100, whereas in the center thereof is arranged a bayonet-type locking means for detachably mounting the gauging device on the casing 11. The centering means on the member 120 more particularly comprises respectively a flat bearing plate or abutment surface 122 (Figures 1 and 2), a cone-shaped socket member or abutment surface 124 (Figures 1, 2 and 5) and a prismatic socket member or abutment surface 126 (Figures 2 and 6). The socket members 124 and 126 serve for purposes of centering the detachable contact finger assembly in relation to the casing 11, whereas the flat bearing plate 122 permits sliding displacement and thus allows for expansion of the casing 11 or of the member 120 as a result of temperature fluctuations.

The bayonet slots 104 in the bayonet female socket member 102 (Figure 3) provided in the casing 11 cooperate with two corresponding pins 128 on the bayonet male plug member 130 (Figure 1). The latter is spring-loaded by means of spring 130' and is provided with a hand locking lever 130a.

A supplementary spring 132 (Figure 1) is also provided which, when released or rendered effective by rotation of a manually operable eccentric 136, is adapted to act through a pin 134 on the contact finger 106, 106b. Whenever the spring 132 is withdrawn so that the spring effect thereof is removed from the contact finger 106, i.e., when the spring 132 is in the position illustrated in Figure 1, the contact finger 106 is solely under the influence of the conventional return spring arranged within the dial gauge 114. Hence, an internal diameter can be sized. On the other hand, when the eccentric 136 is turned into the position in which it permits the spring 132 to act upon the contact finger 106 through the pin 134, the spring 132 is effective in opposition to the return spring in the gauge 114 and outside diameters of workpieces can then be tested.

*Operation*

The gauging device that has been described is operated as follows:

The planetary spindle 36a is used, for instance, to grind a bore 140 (Figure 1) in a workpiece 138 in a manner that is well understood. It is assumed that the workpiece 138 has been clamped on a coordinate grid top table 139. When the grinding operation is over, the spindle 9 together with the working spindle 36a are withdrawn axially so that the grinding wheel 36 is thereby lifted out of the bore 140. The support or bearer member 120 with the contact finger assembly is now affixed to the casing 11 by means of the bayonet-type lock assembly 104 and 128. By suitable adjustment of the slide 116, the contact finger 106 is then moved into contact with the internal ground surface of the bore 140 whereupon the spindle 9 is slowly rotated about the axis 9a thereof. If desired, the spindle 9 and the contact finger 106 may be axially lowered and raised inside the bore 140 in any suitable manner. The contact finger 106 slides over the surface of the bore 140 and its deflections are registered on the dial of the gauge. As is conventional with such contact finger gauges the described method of testing permits the following points to be checked: (1) whether the bore 140 is truly round; and (2) whether the axis of the bore is exactly parallel with the axis of revolution of the spindle 9.

Any deviations therefrom can be found by reading the deflections of the pointer on the dial gauge 114 on either side of a zero position.

When the test has been completed, the contact finger assembly can be removed from the casing 11 by detaching the member 120 and any further machining required can be performed.

However, the testing equipment may also be employed for a further purpose, as will be hereinafter described in somewhat greater detail.

A precisely circular reference ring or bore gauge, of which the diameter corresponds exactly with the true diameter of the required bore 140, is placed or set up on the work table 139 alongside the workpiece 138. The support member 120 supporting the contact finger assembly is then mounted on the casing 11, as described hereinabove, and the table 139 traversed until the contact finger 106 makes contact with the inside of the bore of the reference ring. By suitably traversing the table 139, the reference ring is thereafter accurately aligned with the axis of spindle 9, i.e., accurately centered therewith. This will be the case when the pointer of the gauge 114 ceases to be deflected, i.e., when the pointer remains exactly on zero. The bore of the reference ring must therefore now be exactly coaxial with the axis 9a of the spindle 9. The table 139 is then returned until the contact finger 106 engages the inside of the bore 140, as shown in Figure 1. Again, the spindle 9 is slowly rotated about the axis 9a thereof and the deflection of the pointer of the dial gauge 114 from zero noted. The difference represents the difference between the radius of the reference ring and of the bore 140. The operator now removes the testing gauge assembly 120 and by traversing the casing 11 in relation to the part 10 he feeds the spindle 36a into the workpiece 138. The amount of in-feed is preferably kept somewhat less than the difference between the zero position and the indicated deflected position of the pointer on the gauge. Machining of the bore is continued. Naturally, the operator may break down the total in-feed into individual stages and repeat the gauge test at the end of each stage. To achieve maximum accuracy in gauging and machining, it is, however, advisable shortly before reaching the final size of the bore 140 to traverse the contact finger 106 back to the reference ring, to re-check for center and then to return to the bore 140. If the bore already proves to be true to size, the pointer on the dial of the gauge 114 will show no deflection when testing the reference ring and the roundness of the bore 140 in succession.

When changing over, as described above, from the reference ring to a bore being truly round but of smaller size than the reference ring, the dial gauge will show a constant deflection from zero position. Due to this deflection the difference between the radius of the reference ring and that of the bore is determined and thus also the amount of in-feed of the grinding wheel 36 that will be necessary for achieving the maximum accuracy. While the grinding wheel is fed for the same amount by means of displacing the housing 11 in the slide 10 (in Fig. 1 to the left) the three-point bearing as well as the measuring device are simultaneously moved towards the optical axis 9a (in Fig. 1 to the left). At the same time the pointer of the dial gauge returns to the zero position. When testing the bore after completion of the grinding movement, the gauging device shows a deflection from its zero position which directly shows the increase of the radius obtained by the grinding movement. In order to achieve the above-described results, however, it is necessary that the feeler lever 106 tests the bore 140 on the spot lying diametrically opposite to the point of engagement of the grinding wheel 36 and the bore 140.

The possibility of performing the above-described precision tests with the contact finger assembly and therewith also of achieving the high accuracy in machining is rendered possible by reason of the fact that no tool has to be removed from its holder during the sizing test and the sizing equipment is permanently maintained in the same position in relation to its reference base, i.e., the axis of the spindle 36a, without requiring any special steps owing to the provision of the centering points on the casing. The tool 36 and the tool spindle 36a, therefore, remain supported permanently in the tool holder constituted by the casing 11 and the spindle 9.

As has already been mentioned, the centering means comprises a three-point bearing which insures not only the maintenance of an accurately predetermined basic position but also allows for any undesirable expansion of the individual parts due to variations in the temperature.

The provision of the double slide 116 permits the contact finger 106 to be traversed in relation to the axis 9a of the spindle 9 through a considerable range, so that, in practice, sizing tests can be carried out on small as well as on very large bores. The contact finger 106 itself is an exchangeable pin which can be screwed into a hole 106a (Figure 1) in the rocker or pivot member 106b. The length of the contact finger 106 and the size of its spherical contact head may, therefore, be readily adapted to the nature of the working conditions, that is to say, to the length of the spindle and/or the length of the bore that is being machined.

It will be readily understood that application of the gauging equipment is not confined to sizing circular bores and that, as shown in Figures 7 to 11, conical surfaces (Figure 7), cylindrical outer surfaces (Figure 9), as well as plane surfaces (Figures 10 and 11) can be tested. Moreover, it is not necessary that the contact finger should be directly inserted into the hole 106a in the rocker 106b. An intermediate member 106c (Figure 10) or 106c' (Figure 11) may be fitted or inserted between the rocker 106b and the contact finger itself.

In conclusion, it will be readily understood that the subject matter of the present invention naturally permits structural modification, provided always that the gauging equipment is mounted outside the actual tool drive spindle bearings and that it can be adjusted by centering means in such a way that its relative basic position to the spindle will always be the same. Moreover, the entire arrangement is not confined to an application in conjunction with a machine of the aforementioned kind, i.e., a grinding machine, but can be readily used in connection with any other machine or apparatus comprising a revolving member, such as, for instance, an orbiting chuck. Also, the method of attaching and centering the gauging device in relation to the spindle may be of some structural kind other than that hereinabove described.

While I have shown and described several embodiments in accordance with the present invention, it is understood that the same is not limited thereto, but is susceptible of many changes and modifications within the spirit of the present invention and I intend to cover all such changes and modifications as incorporated by the appended claims.

I claim:

1. In a machine tool provided with a rotatable tool holder for accommodation therein of a tool spindle provided with a work tool, a detachable gauging device, means for readily positioning said gauging device to said tool holder in a predetermined fixed position relative to said spindle including positioning means on said tool holder and said gauging device, and means for detachably securing said gauging device to said tool holder.

2. In a machine tool provided with a rotatable tool holder for accommodation therein of a tool spindle provided with a work tool, a detachable gauging device, means for readily positioning said gauging device to said tool holder in a predetermined fixed position relative to said spindle including positioning means on said tool holder and said gauging device, and means for detachably securing said gauging device to said tool holder, said securing means including a bayonet-type fitting.

3. In a machine tool provided with a rotatable tool holder for accommodation therein of a tool spindle provided with a work tool, a detachable gauging device, means for readily positioning said gauging device to said tool holder in a predetermined fixed position relative to said spindle including positioning means on said tool holder and said gauging device, and means for detachably securing said gauging device to said tool holder, said positioning means including three-point bearing means.

4. The combination according to claim 3, wherein said three-point bearing means includes means at two of said points to enable expansion of the parts due to fluctuations in the temperature.

5. The combination according to claim 1, wherein said gauging device includes a dial gauge and contact finger means for actuating said dial gauge.

6. The combination according to claim 1, wherein said gauging device includes gauging means, and wherein said tool holder and said gauging means may be moved relative to each other.

7. In a machine tool provided with a rotatable tool holder for securing therein a tool spindle provided with a work tool, a gauging device assembly including support means and gauging means movably secured to said support means to enable at least rectilinear movement of said gauging means with respect to said support means, and means including three-point bearing means for readily detachably securing said assembly at said tool holder in a fixed predetermined position relative to said work spindle.

8. In a machine tool provided with a rotatable tool holder rotatable about a principal axis, said tool holder being provided with a tool spindle for attachment thereon of a work tool rotatable about a secondary axis, a detachable gauging device assembly, and means for readily detachably securing said gauging device assembly to said tool holder at a predetermined fixed position relative to said spindle including adjusting means for adjusting said gauging device in relation to said spindle.

9. In a machine tool according to claim 8, wherein said gauging device includes feeler means, and slide means mounting said feeler means on said gauging device to enable relative movement thereof with respect to one of said axes.

10. The combination according to claim 8, wherein said gauging device assembly includes support means, gauging means, and slide means slidably mounting said gauging means on said support means.

11. The combination according to claim 1, wherein said tool holder is slidably mounted on said machine tool for the purpose of displacing said tool holder transversely to the axis of rotation thereof.

References Cited in the file of this patent

UNITED STATES PATENTS

| | | |
|---|---|---|
| 1,664,823 | Knowles | Apr. 3, 1928 |
| 1,950,815 | Rhyne | Mar. 13, 1934 |
| 2,363,946 | Curry | Nov. 28, 1944 |
| 2,421,180 | Barrett | May 27, 1947 |
| 2,458,472 | Irwin | Jan. 4, 1949 |
| 2,608,807 | Nilsen et al. | Sept. 2, 1952 |